No. 843,883. PATENTED FEB. 12, 1907.
W. C. FOWNES, Jr. & R. J. GARDNER.
PIT CAR WHEEL.
APPLICATION FILED JULY 12, 1906.
2 SHEETS—SHEET 1.
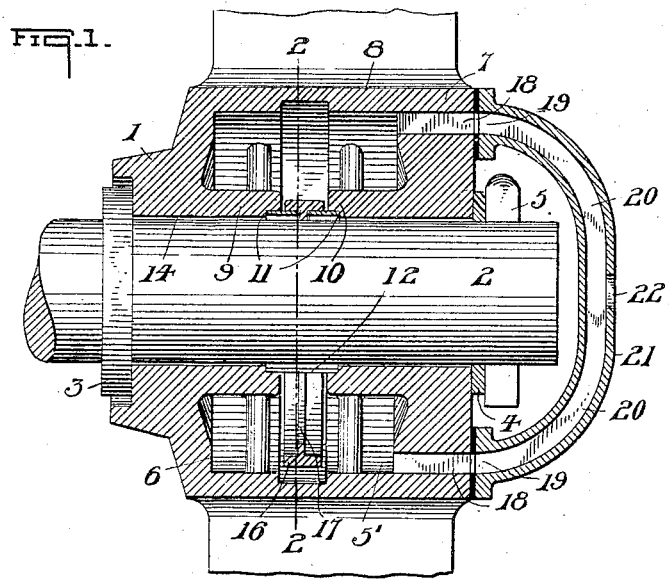
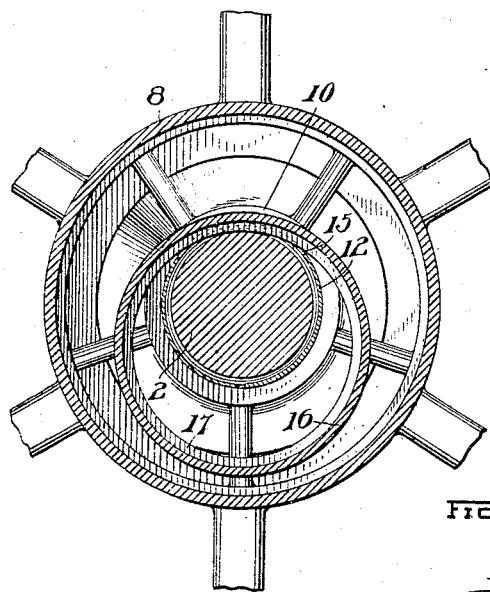
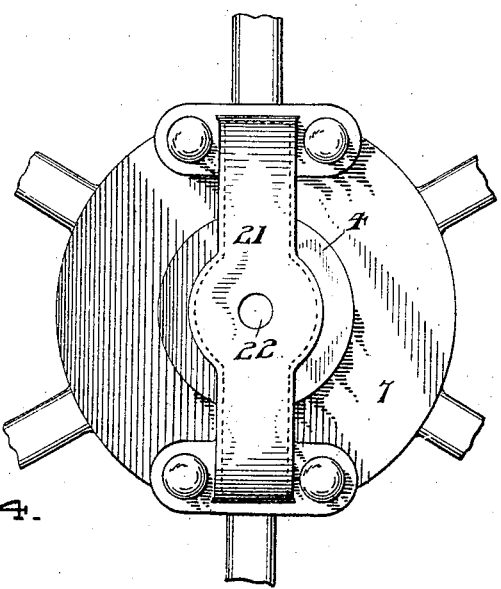
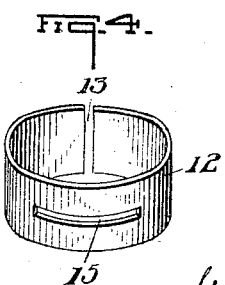
WITNESSES:
INVENTORS
Wm. C. Fownes, Jr.,
Robt. J. Gardner,
by Pierce & Barber,
their ATTORNEYS No. 843,883. PATENTED FEB. 12, 1907.
W. C. FOWNES, Jr. & R. J. GARDNER.
PIT CAR WHEEL.
APPLICATION FILED JULY 12, 1906.
2 SHEETS—SHEET 2.
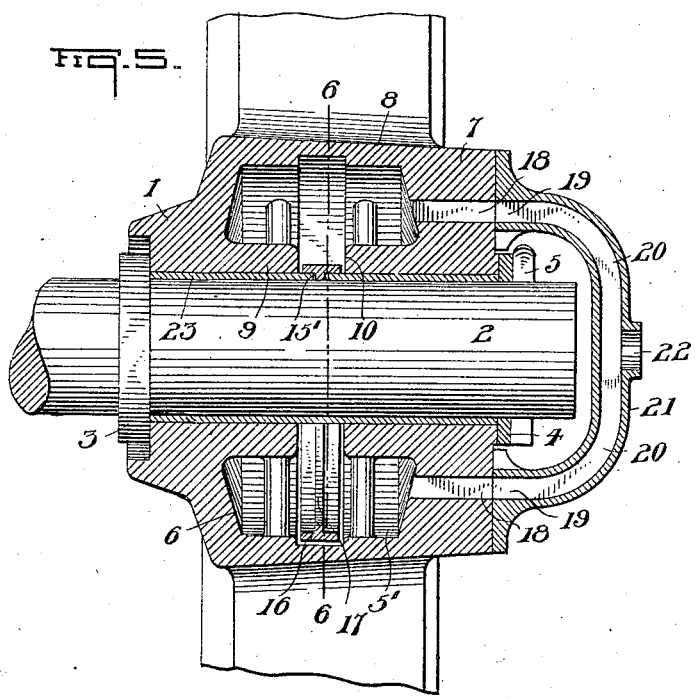
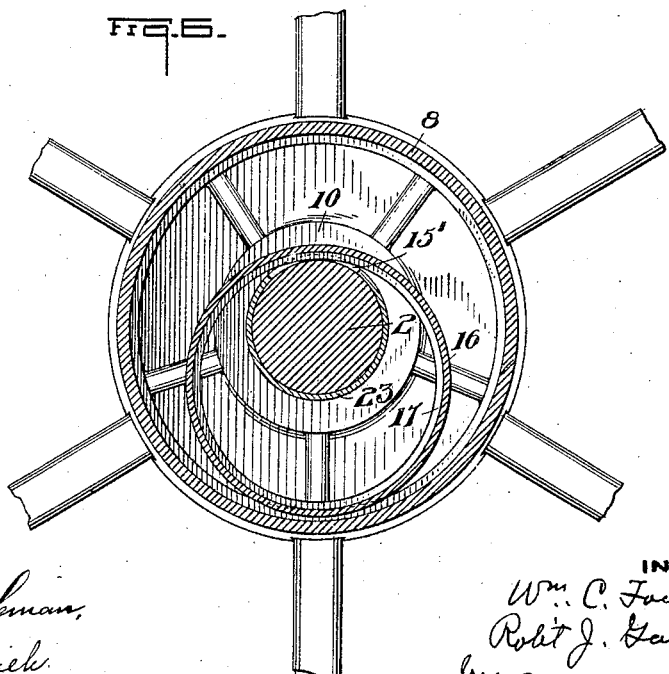
WITNESSES:
INVENTORS
Wm. C. Fownes, Jr.,
Robt. J. Gardner,
by Pierce & Barber,
their ATTORNEYS

UNITED STATES PATENT OFFICE.

WILLIAM C. FOWNES, JR., AND ROBERT J. GARDNER, OF PITTSBURG, PENNSYLVANIA, ASSIGNORS TO JARVIS ADAMS COMPANY, OF PITTSBURG, PENNSYLVANIA, A CORPORATION OF PENNSYLVANIA.

PIT-CAR WHEEL.

No. 843,883.　　　　Specification of Letters Patent.　　　　Patented Feb. 12, 1907.

Application filed July 12, 1906. Serial No. 325,763.

*To all whom it may concern:*

Be it known that we, WILLIAM C. FOWNES, Jr., and ROBERT J. GARDNER, citizens of the United States, both residing at Pittsburg, in the county of Allegheny and State of Pennsylvania, have invented or discovered new and useful Improvements in Pit-Car Wheels, of which the following is a specification.

Our invention has particular reference to pit-car wheels, but it also relates to pulleys and other wheels rotating on fixed shafts or axles.

One object of our invention is to provide a device for conducting oil which will enable an inspector to ascertain if the axle is dry without removal of the wheel. Where the end of the axle is entirely covered, the axle is liable to become dry before its condition becomes known, whereby the wheel and axle become damaged, as will be clearly understood.

Other objects will appear in the following description of our invention.

Referring to the drawings, Figure 1 is a longitudinal central section of one form of our invention; Fig. 2, a section on the line 2 2 of Fig. 1; Fig. 3, an end view of Fig. 1 looking toward the left; Fig. 4, a perspective of the controlling-collar for the oiling-ring; Fig. 5, a longitudinal section of a modified form of our invention, and Fig. 6 a section on the line 6 6 of Fig. 5.

Referring to Figs. 1, 2, and 3 of the drawings, 1 represents the hub of a car-wheel or other device on the axle or shaft 2.

3 is a fixed collar encircling the axle at one end of the hub to limit the inward movement of the wheel, and 4 is a washer on said axle, the washer being located between the remaining end of the hub and the key or cotter-pin 5 in the axle.

The hub is provided with the annular space 5', inclosed by the ends 6 and 7 of the hub, the outer periphery 8 thereof, and the inner wall 9 thereof, which is in frictional contact with the axle 2. The wall 9 is provided with the annular slot 10, which extends through the whole thickness thereof and is provided next to the axle with the annular recessed shoulders 11. Seated on these shoulders and preferably out of contact with the axle is the metal sleeve 12. This sleeve is preferably made of spring material, open at 13, so that it may be contracted in diameter and pushed endwise into the axial opening 14 of the hub until it reaches the slot 10, when it will expand into the same and become seated against the shoulders 11 with sufficient friction to cause it to rotate with the hub. The sleeve 12 is provided with a slot 15, which extends around the same for only a portion of its periphery. The oil-ring 16 encircles the sleeve and rests upon the same, the lower part of the ring resting in the oil in the lower portion of the receptacle or reservoir 5'. Preferably the ring has interiorly the annular rib 17, which may extend through the slot 15 and contact with the axle, while the body of the ring rests on the sleeve; but these details may be varied, if desired.

The outer end of the hub 1 is provided with the diametrically opposite holes 18, which register with the inlets 19 of the oil-ducts 20 in the oil-feeding device 21. This device consists of a hollow piece of metal arched over the end of the axle, its width being such as to permit access to the axle 2, the washer 4, and the pin 5, there being sufficient space between the hub and each side of the oil-feeding device 21 for such purpose. It will be noted that the device 21 covers only a portion of the end of the hub, leaving the end of the axle and the wheel-fastening devices accessible at each side of the device 21. By rotating the wheel to a proper position the key or pin 5 may be driven out or withdrawn without detaching the device 21 from the wheel.

22 is an opening in the convex face of said device 21 and in alinement with the center of the axle 2, through which opening oil may be supplied to the ducts 20. Oil may be supplied through the opening 22 when the wheel is moving, which is quite advantageous in case the wheel be a pulley or similar rotary element.

Figs. 5 and 6 show another form of our invention, wherein the sleeve 12 of Fig. 4 is modified so as to extend through the hub. The modified sleeve is designated by the numeral 23. It is provided with the slot 15', which is located between the side walls of the slot 10, so that the rib 17 of the ring 16 may enter the same intermittently as the wheel rotates.

In both forms of our invention the slot in the sleeve permits the ring to feed oil to the axle during a portion of the revolution of the wheel. During the remainder of the revolution thereof the ring rests upon the unslotted portion of the sleeve and no oil is fed to the axle. The rotation of the sleeve causes the rotation of the ring 16, so that when the rib 17 sinks into the slot 15 it will bring a fresh supply of oil along with it from the reservoir 5'.

Many modifications may be made in our invention, since the slotted sleeve may be made an integral part of the wheel, the rib 17 may be omitted or modified in cross-section, the ring 16 may be exchanged for a chain or other oil-feeding device, and the details described may be otherwise varied or be in some cases omitted without departing from the spirit of our invention.

We claim—

1. In a rotary device, a hollow hub serving as an oil-receptacle, an oiling-ring therein, and means for causing the said ring to feed oil to the axle intermittently.

2. In a rotary device, a hollow hub serving as an oil-receptacle, a sleeve surrounding the axle and carried by the hub, and an oiling-ring encircling said sleeve, said sleeve having a portion arranged to lift said ring out of contact with the axle intermittently.

3. In a rotary device, a hollow rotatable hub serving as an oil-receptacle, a sleeve encircling the axle and carried by said hub, said sleeve having a peripheral slot for a portion of its circumference, and an oiling-ring adapted to feed oil through said slot during a portion of the revolution of the wheel.

4. In a rotary device, a hollow hub serving as an oil-receptacle, a sleeve encircling the axle but out of contact therewith and carried by said hub, and an oiling-ring encircling said sleeve, there being a slot in the sleeve for causing the ring to feed oil to the axle intermittently.

5. In a rotary device, a hollow rotatable hub serving as an oil-receptacle, and an oiling-ring therein encircling the axle, there being a slot for a portion only of the circumference of the wall between the oil-receptacle and the axle, whereby the ring may during a portion of the revolution of the wheel feed oil through said slot to the axle.

6. In a rotary device, a hollow hub serving as an oil-reservoir and having a slot through the inner wall thereof, and an oiling-ring having a flange adapted to extend through said slot and supply the bearing with oil.

Signed at Pittsburg, Pennsylvania, this 6th day of July, 1906.

WILLIAM C. FOWNES, Jr.
ROBERT J. GARDNER.

Witnesses:
F. N. BARBER,
ALICE E. DUFF.

Correction in Letters Patent No. 843,883.

It is hereby certified that the name of the assignee in Letters Patent No. 843,883, granted February 12, 1907, upon the application of William C. Fownes, Jr., and Robert J. Gardner, of Pittsburg, Pennsylvania, for an improvement in "Pit-Car Wheels," was erroneously written and printed "Jarvis Adams Company," whereas said name should have been written and printed *S. Jarvis Adams Company;* and that the said Letters Patent should be read with this correction therein that the same may conform to the record of the case in the Patent Office.

Signed and sealed this 2nd day of April, A. D., 1907.

[SEAL.]

E. B. MOORE,
*Acting Commissioner of Patents.*